(12) United States Patent
Unger (10) Patent No.: US 10,342,296 B2
(45) Date of Patent: Jul. 9, 2019

(54) METHODS AND SYSTEMS FOR ORNAMENTING SAFETY SEATS

(71) Applicant: Natalie Beth Unger, Wabash, IN (US)

(72) Inventor: Natalie Beth Unger, Wabash, IN (US)

(73) Assignee: 2B, LLC (2B), Wabash, IN (US)

( * ) Notice: Subject to any disclaimer, the term of this patent is extended or adjusted under 35 U.S.C. 154(b) by 0 days.

(21) Appl. No.: 15/597,443

(22) Filed: May 17, 2017

(65) Prior Publication Data
US 2017/0332740 A1    Nov. 23, 2017

Related U.S. Application Data

(60) Provisional application No. 62/337,594, filed on May 17, 2016.

(51) Int. Cl.
*A44B 11/00*        (2006.01)
*B60N 2/28*        (2006.01)

(52) U.S. Cl.
CPC .......... *A44B 11/003* (2013.01); *B60N 2/2803* (2013.01); *B60N 2002/2815* (2013.01)

(58) Field of Classification Search
CPC ............ A44B 11/2576; A44B 11/2546; A44B 11/2573; Y10T 24/45084; B60R 2022/4866; B60R 2022/006
See application file for complete search history.

(56) References Cited

U.S. PATENT DOCUMENTS

| | | | |
|---|---|---|---|
| 3,484,908 A | 12/1969 | Lamb | |
| 4,502,194 A | 3/1985 | Morris et al. | |
| 4,595,618 A | 6/1986 | Caringer | |
| 4,624,033 A | 11/1986 | Orton | |
| 4,675,954 A | 6/1987 | Gullickson | |
| 4,878,277 A | 11/1989 | Portuese | |
| 4,901,407 A | 2/1990 | Pandola et al. | |
| 4,939,824 A | 7/1990 | Reed | |
| 4,944,530 A | 7/1990 | Spurrier | |
| 4,961,251 A | 10/1990 | Smith | |
| 4,973,106 A | 11/1990 | Stroviskas | |
| D323,363 S | 1/1991 | Ely | |
| 4,987,662 A | 1/1991 | Haffey et al. | |
| 4,989,888 A | 2/1991 | Qureshi et al. | |
| D337,075 S | 7/1993 | Powell | |
| 5,312,159 A * | 5/1994 | Essa ........................ | B60R 22/00 297/482 |
| D358,246 S | 5/1995 | Bacchiocchi et al. | |

(Continued)

FOREIGN PATENT DOCUMENTS

| | | |
|---|---|---|
| KR | 2013-0128249 | 11/2013 |
| KR | 2015-0004371 | 12/2015 |
| KR | 2016-0049275 | 5/2016 |

OTHER PUBLICATIONS

International Search Report and Written Opinion dated Aug. 14, 2017 for PCT/US17/33097.

*Primary Examiner* — Shin H Kim
(74) *Attorney, Agent, or Firm* — Hartman Global IP Law; Gary M. Hartman; Domenica N. S. Hartman (57) ABSTRACT

Systems and methods capable of changing the aesthetic appearance of a safety seat by covering portions thereof with an ornamental accessory. The systems includes the ornamental accessory and an attachment system configured for removably securing the ornamental accessory to a belt system of the safety seat.

20 Claims, 10 Drawing Sheets

(56) References Cited

U.S. PATENT DOCUMENTS

| | | |
|---|---|---|
| 5,442,840 A | 8/1995 | Ewald |
| 5,463,369 A | 10/1995 | Lamping |
| 5,617,617 A | 4/1997 | Gustin |
| 5,656,994 A | 8/1997 | Heninger |
| D387,887 S | 12/1997 | Jensen |
| 5,732,975 A | 3/1998 | Gallegos |
| D396,736 S | 8/1998 | Davis |
| D396,938 S | 8/1998 | Bugatti |
| D402,437 S | 12/1998 | Silk |
| D418,275 S | 1/2000 | Contreras |
| 6,041,480 A | 3/2000 | White |
| 6,105,219 A | 8/2000 | Beadle |
| 6,142,575 A | 11/2000 | Patterson |
| 6,409,271 B1 | 6/2002 | Caramanis |
| 6,554,363 B1 * | 4/2003 | Silva .............. A47C 7/383 297/397 |
| D481,522 S | 11/2003 | Conforti |
| 6,668,433 B1 | 12/2003 | Hood |
| 6,769,157 B1 | 8/2004 | Meal |
| D497,241 S | 10/2004 | Sirois |
| D518,412 S | 4/2006 | Berke et al. |
| 7,512,993 B1 * | 4/2009 | Gutierrez ............ A41B 13/10 2/49.1 |
| D618,136 S | 6/2010 | Ward |
| D630,970 S | 1/2011 | McNaughton |
| D662,277 S | 6/2012 | Dorsey |
| D708,420 S | 7/2014 | Rosales |
| D713,618 S | 9/2014 | Ciampitti et al. |
| 9,010,808 B2 * | 4/2015 | Kampondeni ........ B60R 22/00 280/805 |
| 9,027,185 B2 * | 5/2015 | Garcia ............... A47C 7/383 5/636 |
| 9,199,604 B1 | 12/2015 | Phillips |
| 9,393,886 B2 * | 7/2016 | Berger ............... B60N 2/2812 |
| 9,439,479 B1 * | 9/2016 | Vu .................... A44B 11/2576 |
| 2002/0112327 A1 | 8/2002 | Baloga |
| 2004/0070256 A1 | 4/2004 | Lee |
| 2007/0289111 A1 | 12/2007 | Mandarino et al. |
| 2008/0179936 A1 | 7/2008 | Mirmikidis |
| 2012/0264349 A1 | 10/2012 | Ciampitti et al. |

* cited by examiner

METHODS AND SYSTEMS FOR ORNAMENTING SAFETY SEATS

CROSS REFERENCE TO RELATED APPLICATIONS

This application claims the benefit of U.S. Provisional Application No. 62/337,594, filed May 17, 2016, the contents of which are incorporated herein by reference.

BACKGROUND OF THE INVENTION

The present invention generally relates to child restraint systems used in passenger vehicles. The invention particularly relates to systems and methods of changing the aesthetic appearance of child and infant safety seats without interfering with their operation and safe use.

Various types of child restraint systems are commercially available and in use. For convenience, the term "safety seat" will be used herein to refer to various types of child restraint systems used in passenger vehicles, including but not limited to child safety seats, infant safety seats, and booster seats. Generally, safety seats include a belt (harness) system capable of securing and restraining a child in the safety seat during operation of a passenger vehicle. Belt systems often include two or more belts (straps) that are adapted to be releasably coupled to one another with a buckle system comprising one or more buckles (clasps). Buckle systems are often utilitarian and undecorated.

In view of the above, it can be appreciated that there is an unmet demand for systems and methods capable of at least partly changing the aesthetic appearance of belt systems of safety seats.

BRIEF DESCRIPTION OF THE INVENTION

The present invention provides systems and methods suitable for ornamenting portions of safety seats in order to change the aesthetic appearance thereof.

According to one aspect of the invention, a system is provided for ornamenting a safety seat that includes a belt system comprising at least first and second belts for restraining a child in the safety seat and a buckle system for releasably securing the first and second belts together. The system includes an ornamental accessory for covering at least a portion of the buckle system, and an attachment system configured for removably securing the ornamental accessory to the belt system.

According to another aspect of the invention, a method of ornamenting a safety seat includes removably securing an attachment system to first and second belts of a belt system of the safety seat, and removably coupling an ornamental accessory to the attachment system such that the ornamental accessory covers at least a portion of a buckle system that releasably secures the first and second belts together.

Technical effects of methods and systems as described above preferably include the capability of changing the aesthetic appearance of safety seats by covering portions thereof, preferably including buckles of a harness system, with an ornamental accessory.

Other aspects and advantages of this invention will be further appreciated from the following detailed description.

DETAILED DESCRIPTION OF THE INVENTION

Figure 1:
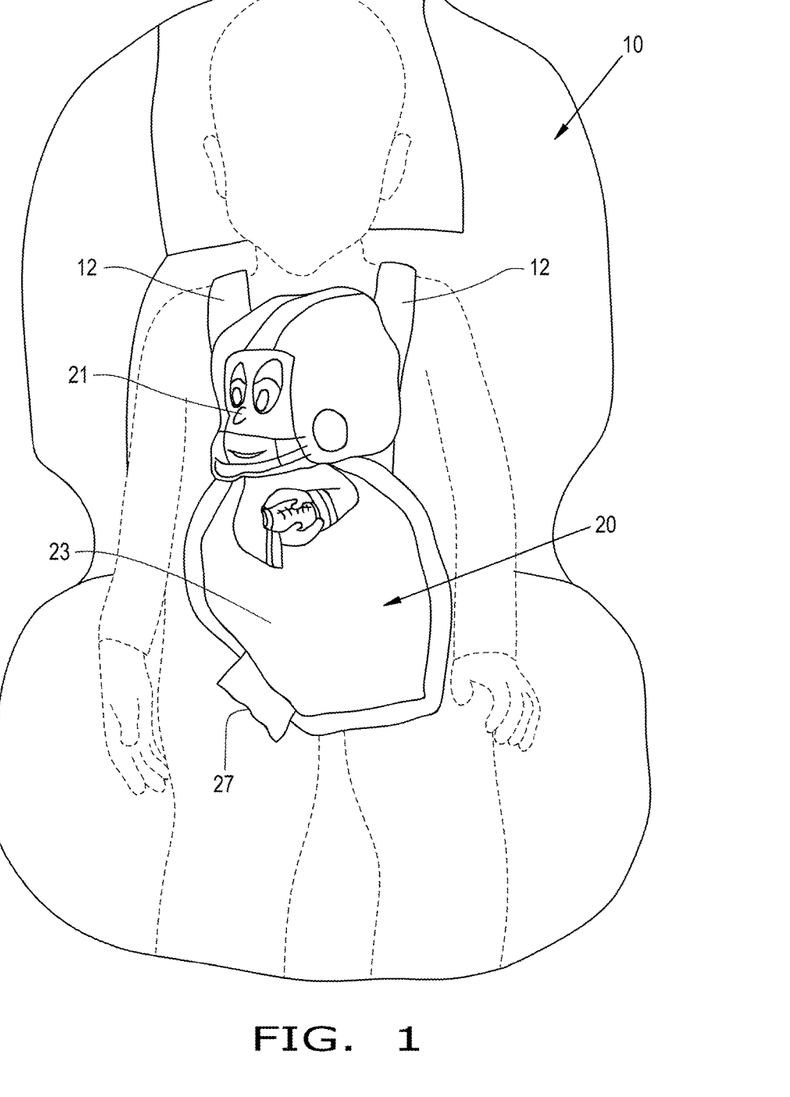
FIG. 1 is an image showing a child secured in a safety seat with portions of the safety seat covered with an ornamental accessory in accordance with a nonlimiting first embodiment of this invention.

Disclosed herein are systems and methods capable of covering portions of restraining belt systems of safety seats. FIG. 1 represents a child secured in a safety seat 10 that includes a belt (harness) system comprising at least first and second belts (straps) 12 for restraining a child in the safety seat 10 and a buckle system comprising unadorned buckles (clasps) 14 (FIGS. 7 and 8) for releasably securing the belts 12 together. A nonlimiting ornamental accessory 20 is secured to the safety seat 10 via the belts 12 in order to cover the unadorned buckles 14. Though the safety seat 10 is represented as comprising a two-belt system for temporarily restraining the child within the safety seat 10, it should be understood that the safety seat 10 is only exemplary and could alternatively be any one of various other types of safety seats, including but not limited to safety seats comprising three-point belt or five-point belt systems, both of which are also common in the industry, as well as various other harness systems.

Figure 2:
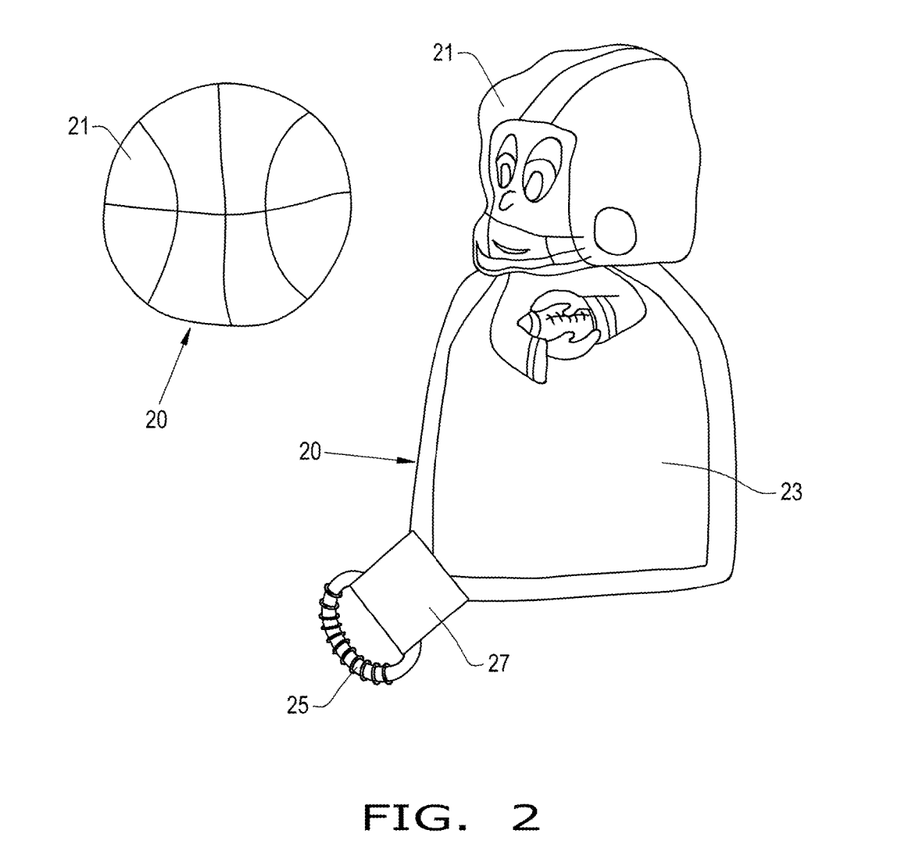
FIGS. 2 through 4 include images showing ornamental accessories in accordance with additional nonlimiting embodiments of this invention.
Figure 3:
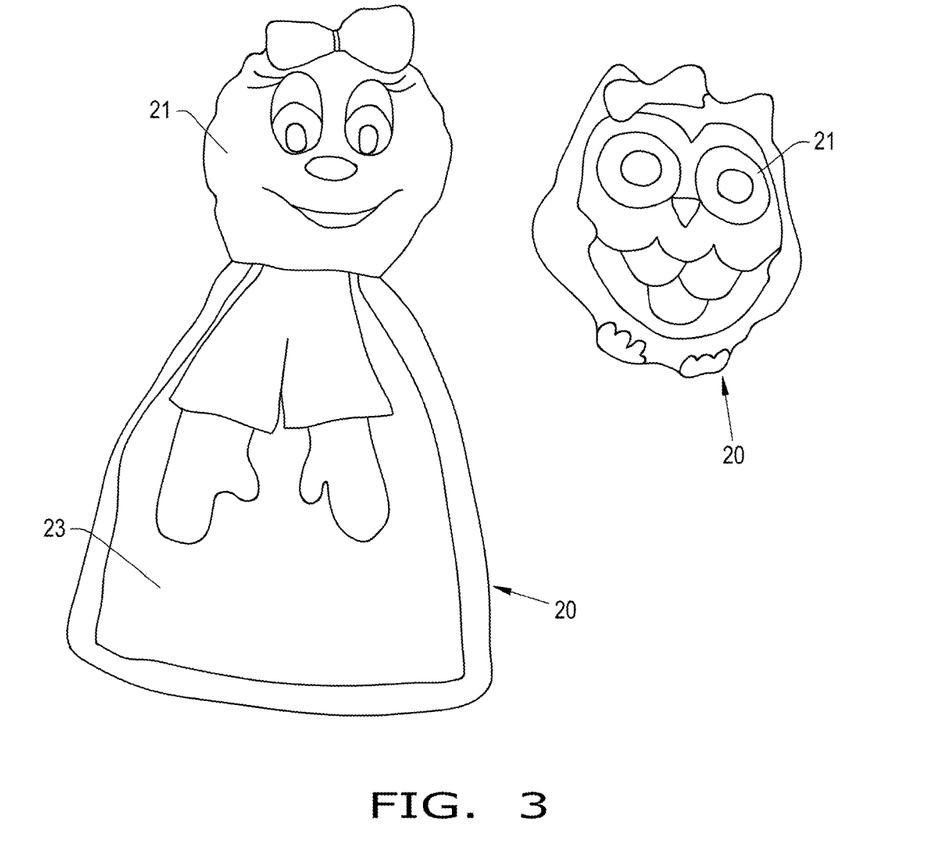
Figure 4:
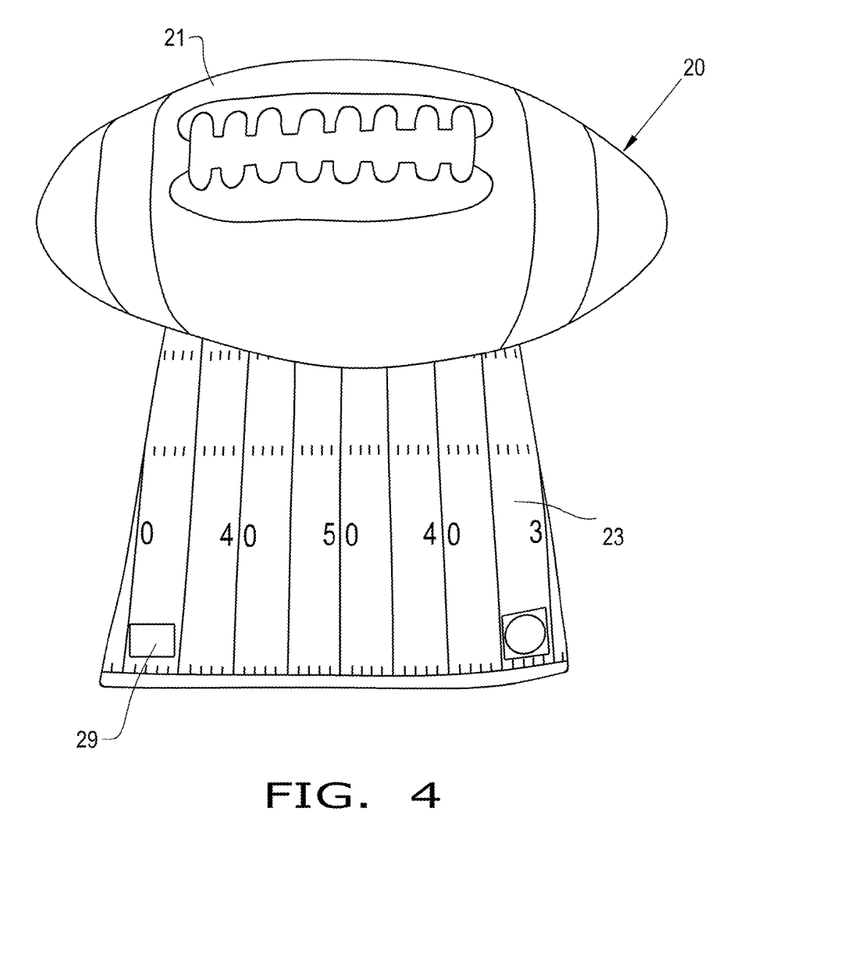

Though a particular accessory 20 is shown in FIG. 1, ornamental accessories 20 within the scope of the invention may have a wide variety of shapes and sizes and may be formed to have likenesses to various objects, animals, people, fictional characters, etc. For example, FIGS. 2 through 4 represent additional nonlimiting embodiments of accessories 20. Preferred materials for the accessories 20 include relatively soft or plush materials that may be comfortable, appealing, and safe for young children, such as those materials common for construction of pillows, stuffed animals, and other children's toys.

Figure 5:
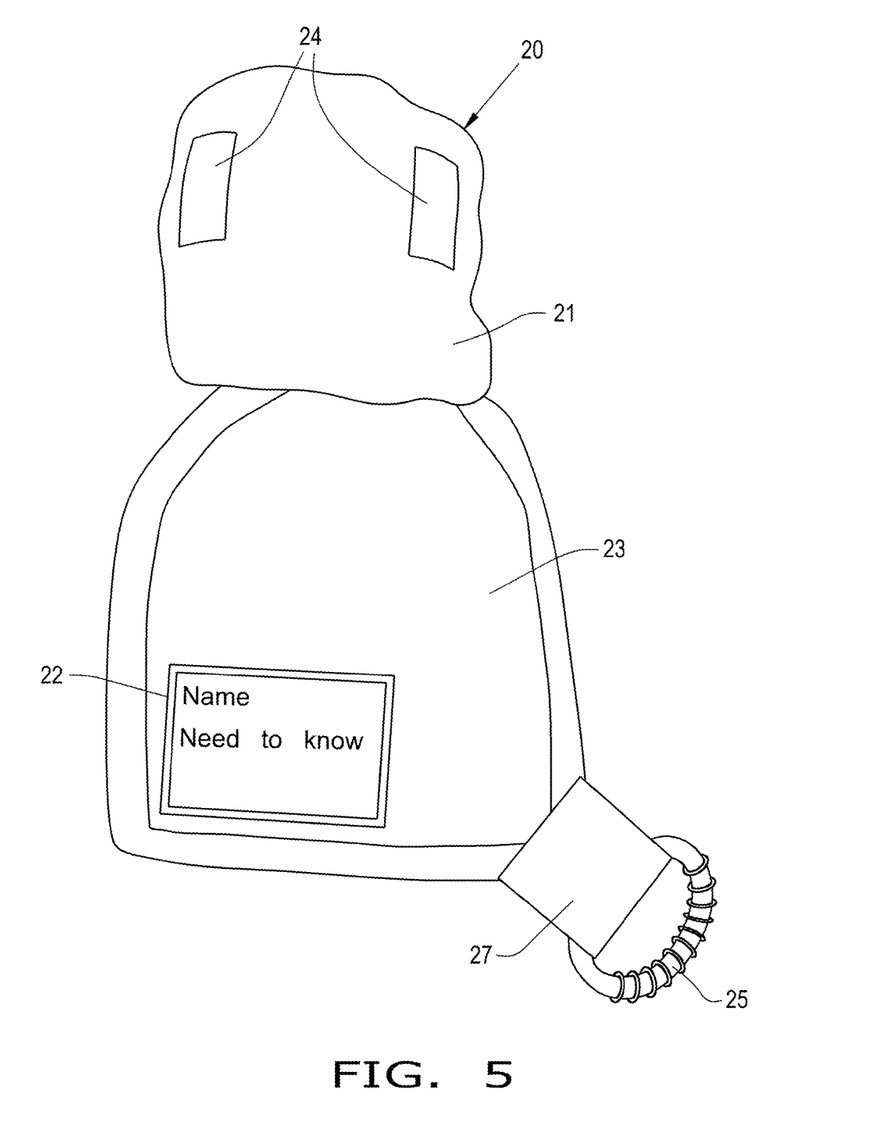
FIGS. 5 and 6 include images showing rear views of the ornamental accessories of FIGS. 1 and 2, respectively.
Figure 6:
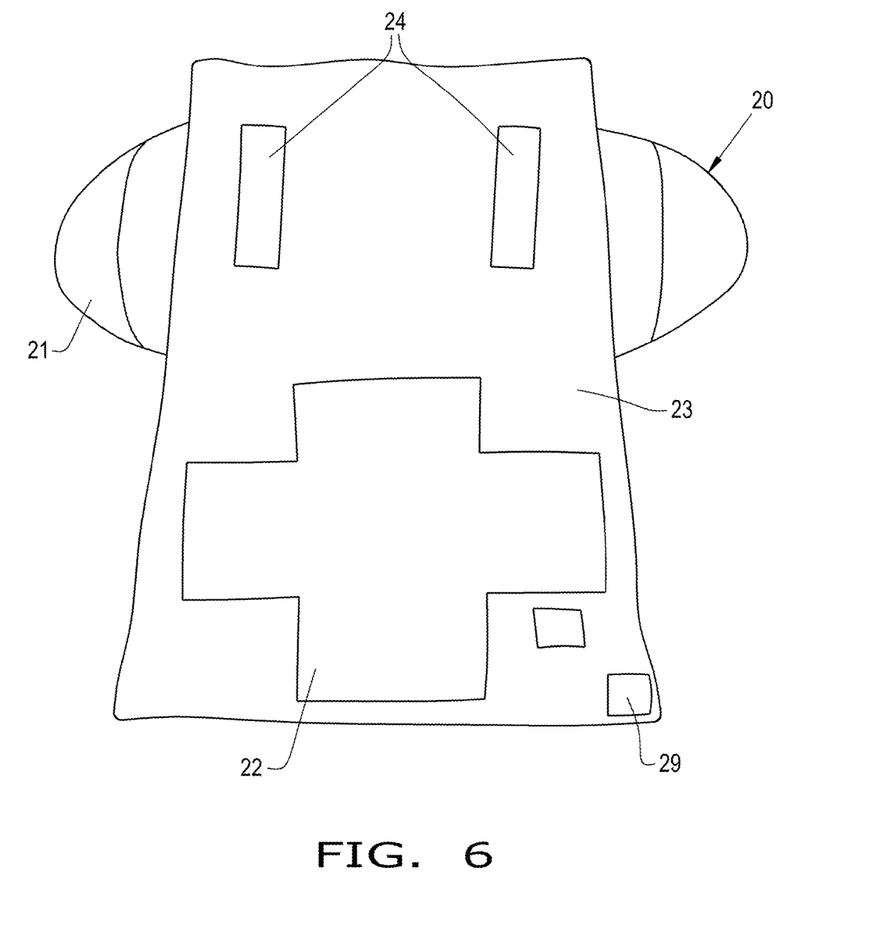

For the purpose of description, the accessory 20 is described herein as comprising at least two sides, including a front side (visible in FIGS. 1-4) and a back side (visible in FIGS. 5 and 6). The front side of an accessory 20 is directed away from the safety seat 10 when installed on the seat 10, and is therefore exposed and viewable by observers (as evident from FIG. 1). The back side of an accessory 20 is directed toward the safety seat 10 when installed on the seat 10, and therefore hidden from view (as evident from FIG. 1). As represented in FIGS. 5 and 6, the back side of the accessory 20 includes a pair of releasable fasteners 24, each capable of attaching the accessory 20 to the safety seat 10 through a complementary feature associated with the belt system of the seat 10, as will be discussed in more detail below. In the nonlimiting example shown, the fastener 24 comprises loops of a complementary hook-and-loop fastener system. FIGS. 5 and 6 represent the accessory 20 as also including labels 22 or other types of markings on its back side to provide various information, for example, manufacturing information, identification of the child, parent, or guardian, information relating to the child (such as allergies), etc. Such markings will likely not affect the aesthetic appeal of the accessories 20 as they may be completely hidden from view when the accessory 20 is coupled to the safety seat 10.

The accessory 20 may have various shapes, sizes, and features. For example, FIGS. 2 and 3 show certain embodiments wherein the accessory 20 is limited to a plush body 21, similar to a pillow or stuffed animal. In addition, FIGS. 2 through 4 show other embodiments wherein the accessory 20 includes both a plush body 21 and a blanket, bib, or cover 23 preferably configured to hang from the plush body 21 and cover a portion of the child in the car seat 10. Additionally, the accessory 20 may include various attached toys or devices commonly used by children. For example, FIGS. 2 and 5 show an embodiment that includes a teething ring 25 for infants secured to the cover 23 with a loop 27 of material. For such embodiment, the loop 27 may be permanently or removably attached to the cover 23. As a nonlimiting example, FIGS. 4 and 6 show the accessory 20 as including fasteners 29 on both the front and back sides of the cover 23. These fasteners 29 may be configured to mate and be secured to corresponding fasteners (not shown) on the loop 27 or other device capable of holding an object to the accessory 20. Although not required, it is preferred that any toys or devices attached to the accessory are located near the lower end of the cover 23 such that the child may use such toy or device over a relative wide range of motion (due to the flexibility of the cover 23) without removing the accessory 20 from the car seat 10.

Figure 7:
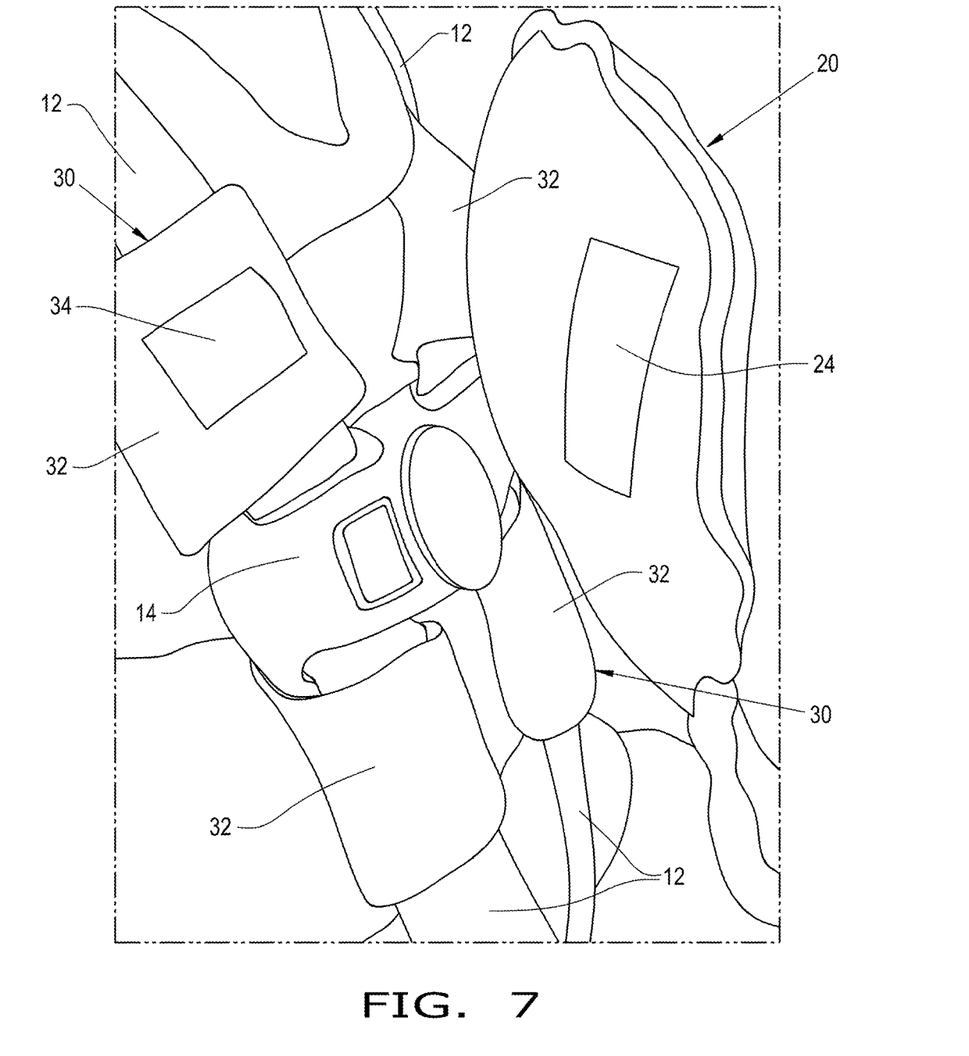
FIGS. 7 and 8 are images depicting a step carried out to secure the ornamental accessory of FIG. 1 with an attachment system in accordance with a nonlimiting embodiment of this invention.
Figure 8:
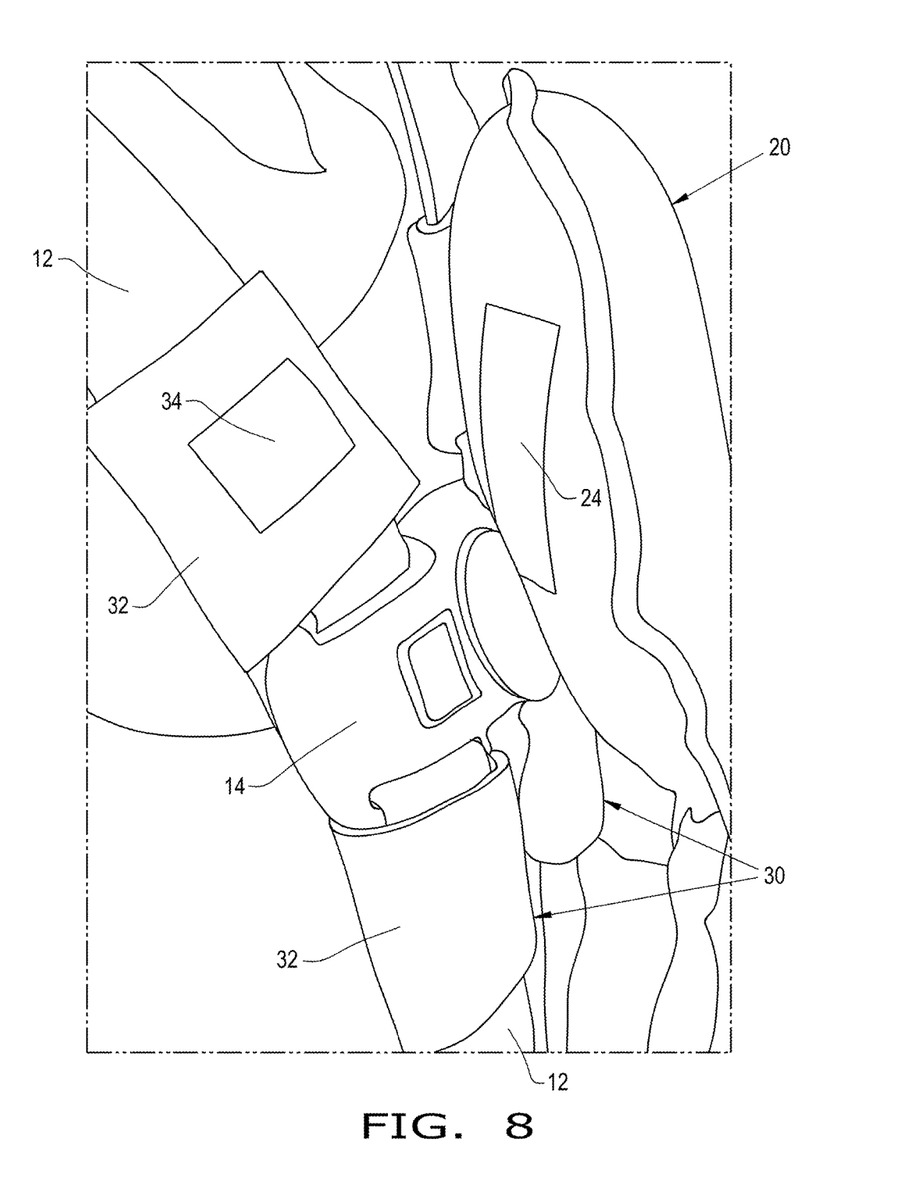

FIGS. 7 and 8 represent a nonlimiting system and method of coupling the accessory 20 to the safety seat 10. As represented, each belt 12 is equipped with an individual attachment device 30, which together constitute what will be referred to herein as an attachment system. The devices 30 are preferably, though not necessarily, identical. FIGS. 7 and 8 represent each device 30 as including an exterior surface 32 having a releasable fastener 34 capable of coupling to one of the fasteners 24 of the accessory 20. In the nonlimiting example shown, the fastener 34 comprises hooks of a complementary hook-and-loop fastener system and is capable of mating with one of the loop-type fasteners 24 located on the back side of the accessory 20. Preferably, by connecting the fasteners 24 of the accessory 20 to the fasteners 34 of both devices 30, the accessory 20 may be relatively easily and removably coupled to the belts 12 of the safety seat 10.

Figure 9:
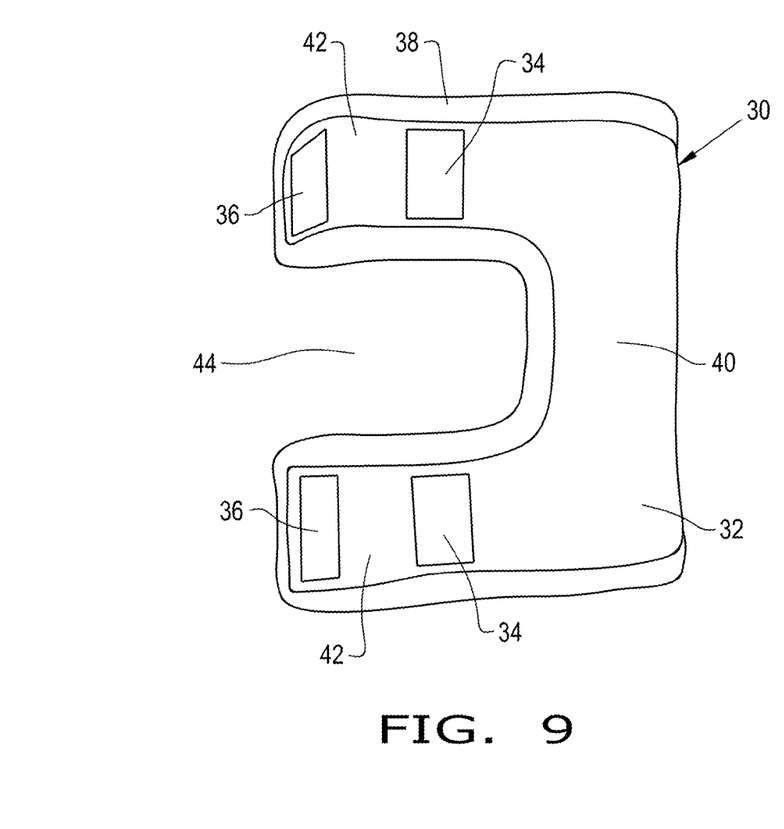
FIGS. 9 through 12 are images showing isolated views of an attachment device of the attachment system of FIGS. 7 and 8.
Figure 10:
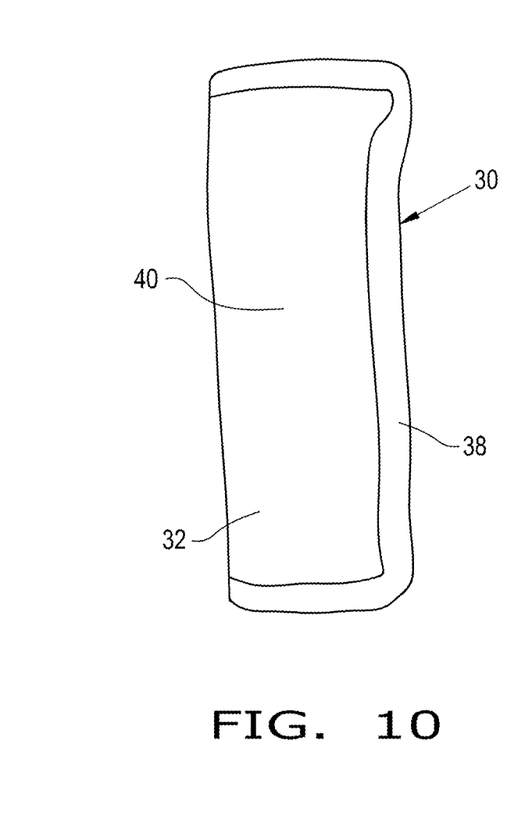
Figure 11:
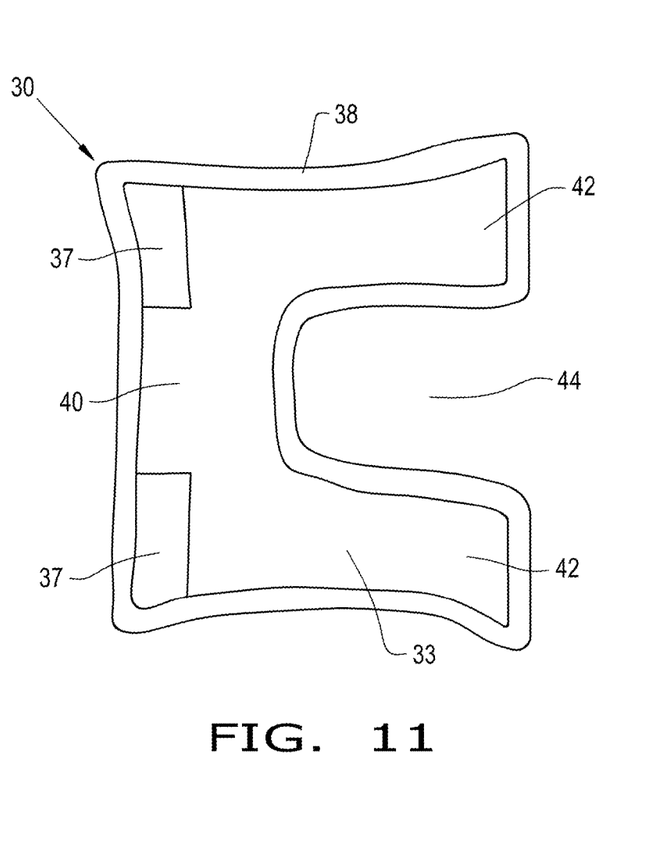
Figure 12:
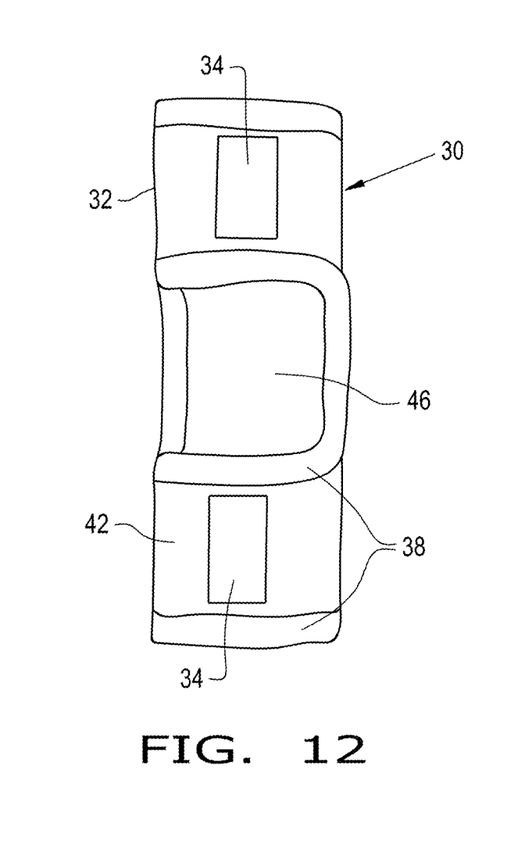

FIGS. 7 and 8 show each attachment device 30 in a closed position, in which the device 30 is individually wrapped around one of the belts 12 of the seat 10. FIGS. 9 through 12 contain images of one of the nonlimiting attachment devices 30 of FIGS. 7 and 8. FIGS. 9 and 11 represent the device 30 in an open position, and FIGS. 10 and 12 represent the device 30 in a closed position (corresponding to the closed position shown in FIGS. 7 and 8). The attachment device 30 generally comprises a body that defines the exterior surface 32 bearing the releasable fastener 34 (FIGS. 9, 10, and 11) as well as an oppositely-disposed interior surface 33 (FIG. 11). Optionally, the device 30 includes trim 38 along the edges of the body for improved comfort to the user.

The body of the device 30 can be seen in FIGS. 9 and 11 as including a base portion 40 and two arms 42 that extend substantially perpendicularly from the base portion 40 and substantially in parallel and spaced apart from each other to define a slot or gap 44 therebetween. The base portion 40 and arms 42 are configured to wrap, curl, or pivot relative to each other, such that the body of the device 30 has a generally tubular or cylindrical shape in the closed position and the gap 44 between the arms 42 defines an opening or window 46 in the circumference of the tubular shape. The device 30 represented in FIGS. 7 through 12 is secured in the closed position (FIGS. 7, 8, 10, and 12) with complementary fasteners. In the embodiment shown, fasteners 36 located at distal ends of the arms 42 on the exterior surface 32 of the device 30 (FIG. 9) contact and mate with fasteners 37 located on the interior surface 33 of the device 30 adjacent an oppositely-disposed edge of the base portion 40 (FIG. 11). As such, the base portion 40 of the device 30 can be wrapped around one of the belts 12 of the safety seat 10 and secured to the arms 42 such that the belt 12 is surrounded by the device 30, as shown in FIGS. 7 and 8. As also seen in FIGS. 7 and 8, in this closed position the window 46 defined by the gap 44 provides access to the buckle 14 associated with the belt 12 around which the device 30 has been wrapped. In such an arrangement, the buckle 14 acts as a barrier to prevent or at least inhibit movement of the device 30 along the longitudinal length of the belt 12.

The fasteners 34 are located on the exterior surface 32 of the device 30 in a position such that when the device 30 is secured to the belt 12 in the closed position as shown in FIGS. 7 and 8, the fasteners 34 face in a direction away from the safety seat 10 and belt 12. This positioning allows the fasteners 34 to mate with the fasteners 24 of the accessory 20, as also evident from FIGS. 7 and 8.

During operation, each attachment device 30 can be individually secured to one of the belts 12 as described such that the fasteners 34 on its exterior surface 32 face away from the safety seat 10, as represented in FIGS. 7 and 8. In the embodiment of the devices 30 shown in the drawings, because the window 46 of each device 30 allows continuous access to the buckle 14 of the belt 12 to which the device 30 is secured, each device 30 is able to remain attached to its corresponding belt 12 between uses of the safety seat 10. Consequently, a child may be inserted into and safely retained in the safety seat 10 with the belts 12 and the buckle 14 according to the normal operation of the safety seat 10 without removing the devices 30. At any time during the use of the safety seat 10, an accessory 20 may be secured to or removed from the devices 30 as desired by coupling or decoupling, respectively, the fasteners 24 and 34. Therefore, accessories 20 may be interchangeably used to cover the buckles 14 without having a significant impact on or interfering with the operation and use of the safety seat 10. Furthermore, a system utilizing the attachment devices 30 may include multiple interchangeable accessories 20 of different shapes, sizes, appearances, etc., to allow a safety seat 10 to be individualized for a particular child who will be using the seat 10.

Although the invention has been described herein in reference to particular configurations and shapes for the devices 30, it should be noted that the teachings of the invention are not limited to any particular configurations and shapes. Those of ordinary skill in the art will recognize that the concepts disclosed herein provide for construction of similarly functioning devices 30 which accommodate other types of safety seats, such as those having different types of belt systems and buckles (clasps). In addition, the invention does not require all of the features or the interfunctionality represented in the drawings.

Therefore, while the invention has been described in terms of specific or particular embodiments, it is apparent that other forms could be adopted by one skilled in the art. For example, the accessories 20, attachment devices 30, and their components could differ in appearance and construction from the embodiments described herein and shown in the drawings, the functions described herein may be performed by components of different construction but capable of a similar (though not necessarily equivalent) function, appropriate measurements could be substituted for those noted, and various materials could be used in the manufacture of the accessories 20, attachments 30, and their components. Accordingly, it should be understood that the invention is not limited to any embodiment described herein or illustrated in the drawings. It should also be understood that the phraseology and terminology employed above are for the purpose of describing the disclosed embodiments, and do not necessarily serve as limitations to the scope of the invention. Therefore, the scope of the invention is to be limited only by the following claims.

The invention claimed is:

1. A system for ornamenting a safety seat that includes a belt system comprising at least first and second belts for restraining a child in the safety seat and a buckle system comprising buckles associated with the first and second belts for releasably securing the first and second belts together, the system comprising:
    an ornamental accessory for covering at least a portion of the buckle system; and
    an attachment system configured for removably securing the ornamental accessory to the belt system, the attachment system comprising an attachment device having first and second arms that define a gap therebetween and fastening means for removably securing the first and second arms to the attachment device so that the gap defines a window of the attachment device through which the buckle of the first belt is accessible when the first and second arms of the attachment device are wrapped around the first belt.

2. The system of claim 1, wherein the attachment system is separate from and removably securable to the ornamental accessory.

3. The system of claim 1, wherein the attachment system is configured to be removably securable to the first and second belts.

4. The system of claim 3, wherein the first and second arms of the attachment device and the buckle of the first belt cooperate to inhibit movement of the attachment system along the first and second belts in longitudinal length directions thereof when the first and second arms of the attachment device are wrapped around the first belt.

5. The system of claim 3, wherein the attachment system is configured to remain secured to at least one of the first and second belts when the first and second belts are not coupled together with the buckle system and to not interfere with the operation of the belt system and the buckle system.

6. The system of claim 1, wherein the ornamental accessory is configured to be removed from the belt system without removing the attachment system from the belt system.

7. The system of claim 1, wherein the ornamental accessory covers the buckle system in its entirety.

8. The system of claim 1, wherein the attachment device is a first attachment device of the attachment system, and wherein the attachment system further comprises a second attachment device having first and second arms that define a gap therebetween and fastening means for releasably securing the first and second arms to the second attachment device so that the gap of the second attachment device defines a window of the second attachment device through which the buckle of the second belt is accessible when the first and second arms of the second attachment device are wrapped around the second belt.

9. The system of claim 8, wherein each of the first and second attachment devices comprises a body having a base portion and the first and second arms thereof extend from the base portion in parallel and spaced apart from each other to define the gap therebetween, the body of each of the first and second attachment devices has an exterior surface and an oppositely-disposed interior surface, the exterior surface of each body has accessory fastening means for removably securing the ornamental accessory to the attachment system, and the fastening means secures the first and second arms of the body to the base portion of the body so that the body defines a tubular shape adapted to wrap around one of the first and second belts and the window thereof is defined in a circumference of the tubular shape.

10. A method for ornamenting a safety seat that includes a belt system comprising at least first and second belts for restraining a child in the safety seat and a buckle system comprising buckles associated with the first and second belts for releasably securing the first and second belts together, the method comprising:
    removably securing an attachment system to the belt system, the attachment system comprising an attachment device having first and second arms that define a gap therebetween and fastening means for removably securing the first and second arms to the attachment device so that the gap defines a window of the attachment device, the attachment system being removably secured to the first belt of the belt system so that the buckle of the first belt is accessible through the window when the first and second arms of the attachment device are wrapped around the first belt; and
    removably securing an ornamental accessory to the attachment system such that the ornamental accessory covers at least a portion of the buckle system of the safety seat.

11. The method of claim 10, wherein the first and second arms of the attachment device and the buckle of the first belt cooperate to inhibit movement of the attachment system along the first and second belts in longitudinal length directions thereof.

12. The method of claim 10, the method further comprising coupling and de-coupling the first and second belts with the buckle system while the attachment system remains secured to at least one of the first and second belts, wherein the attachment system does not interfere with the operation of the belt system and the buckle system.

13. The method of claim 10, further comprising removing the ornamental accessory from the belt system without removing the attachment system from the belt system.

14. The method of claim 10, wherein the ornamental accessory covers the buckle system in its entirety.

15. The method of claim 10, wherein the attachment device is a first attachment device of the attachment system, the attachment system further comprises a second attachment device having first and second arms that define a gap therebetween and fastening means for releasably securing the first and second arms to the second attachment device so that the gap of the second attachment device defines a window of the second attachment device, the method further comprising securing the second attachment device to the second belt of the belt system so that the buckle of the second belt is accessible through the window between the first and second arms of the second attachment device.

16. The method of claim 15, wherein
    each of the first and second attachment devices comprises a body having a base portion and the first and second arms thereof extend from the base portion in parallel and spaced apart from each other to define the gap therebetween, the body of each of the first and second attachment devices has an exterior surface and an oppositely-disposed interior surface, and the step of removably securing the ornamental accessory to the attachment system comprises removably securing the ornamental accessory to the exterior surfaces of the first and second attachment devices.

17. The method of claim 16, further comprising:
securing the first attachment device to the first belt by wrapping the first and second arms thereof around the first belt and securing the first and second arms to the base portion thereof with the fastening means so that the body defines a first tubular shape wrapped around the first belt and the window thereof is defined in a circumference of the tubular shape; and
securing the second attachment device to the second belt by wrapping the first and second arms thereof around the second belt and securing the first and second arms to the base portion thereof with the fastening means so that the body defines a second tubular shape wrapped around the second belt and the window thereof is defined in a circumference of the tubular shape.

18. The method of claim 16, wherein the first and second arms of the first attachment device and the buckle of the first belt cooperate to inhibit movement of the attachment system along the first belt in a longitudinal length direction thereof, and the first and second arms of the second attachment device and the buckle of the second belt cooperate to inhibit movement of the attachment system along the second belt in a longitudinal length direction thereof.

19. The method of claim 16, further comprising:
placing a child in the safety seat after removably securing the attachment system to the belt system; and
coupling the first and second belts with the buckle system through the windows of the first and second attachment devices while the first and second attachment devices remain secured to the first and second belts;
wherein removably securing the ornamental accessory to the attachment system results in the ornamental accessory being positioned at the chest of the child and remaining at the chest of the child as a result of the first and second arms of the first and second attachment devices and the buckles of the first and second belts cooperating to inhibit movement of the attachment system along the first and second belts in longitudinal length directions thereof.

20. A method for ornamenting a safety seat that includes a belt system comprising at least first and second belts for restraining a child in the safety seat and a buckle system comprising buckles associated with the first and second belts for releasably securing the first and second belts together, the method comprising:
removably securing an attachment system to the belt system so that the buckle of the first belt is accessible through a window defined in a first attachment device of the attachment system and the buckle of the second belt is accessible through a window defined in a second attachment device of the attachment system;
placing a child in the safety seat;
coupling the first and second belts with the buckles of the buckle system through the windows of the first and second attachment devices while the first and second attachment devices remain secured to the first and second belts; and
removably securing an ornamental accessory to the attachment system such that the ornamental accessory covers the buckle system of the safety seat and the ornamental accessory is positioned at the chest of the child and remains at the chest of the child as a result of the first and second attachment devices and the buckles of the first and second belts cooperating to inhibit movement of the attachment system along the first and second belts in longitudinal length directions thereof.

* * * * *